US010070271B2

(12) United States Patent
Guo et al.

(10) Patent No.: US 10,070,271 B2
(45) Date of Patent: Sep. 4, 2018

(54) METHOD AND SYSTEM FOR CONFIGURING, SENDING AND RECEIVING PHYSICAL MULTICAST CHANNEL

(71) Applicant: ZTE Corporation, Shenzhen, Guangdong (CN)

(72) Inventors: Senbao Guo, Shenzhen (CN); Yunfeng Sun, Shenzhen (CN); Bo Dai, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 144 days.

(21) Appl. No.: 14/784,763

(22) PCT Filed: Apr. 16, 2014

(86) PCT No.: PCT/CN2014/075526
§ 371 (c)(1),
(2) Date: Oct. 15, 2015

(87) PCT Pub. No.: WO2014/169824
PCT Pub. Date: Oct. 23, 2014

(65) Prior Publication Data
US 2016/0073239 A1 Mar. 10, 2016

(30) Foreign Application Priority Data
Apr. 17, 2013 (CN) .......................... 2013 1 0134132

(51) Int. Cl.
*H04H 20/71* (2008.01)
*H04W 4/06* (2009.01)
(Continued)

(52) U.S. Cl.
CPC ............. *H04W 4/06* (2013.01); *H04L 5/0044* (2013.01); *H04L 5/0048* (2013.01);
(Continued)

(58) Field of Classification Search
CPC .... H04W 4/06; H04W 72/005; H04L 5/0091; H04L 5/0048; H04L 5/0044; H04L 5/0014
See application file for complete search history.

(56) References Cited

U.S. PATENT DOCUMENTS 8,050,679 B2   11/2011  Kwak
9,131,351 B2 *  9/2015  Malladi ................... H04W 4/06
(Continued)

FOREIGN PATENT DOCUMENTS

CN   101841773 A   9/2010
CN   101959137 A   1/2011
CN   101998246 A   3/2011

OTHER PUBLICATIONS

International Search Report in international application No. PCT/CN2014/075526, dated Jul. 9, 2014.
(Continued)

*Primary Examiner* — Clemence S Han
(74) *Attorney, Agent, or Firm* — Oppedahl Patent Law Firm LLC

(57) ABSTRACT

Disclosed are a method and system for configuring a Physical Multicast Channel (PMCH), a method and system for acquiring a PMCH configuration and a method and system for sending and receiving subframes based on the PMCH configuration. The configuration method includes the following step: a base station configuring information for the PMCH or a Multimedia Broadcast and Multicast Service (MBMS) through a high-layer signalling and/or a predefinition and/or a Multicast Control Channel (MCCH). The configured information is at least one of a transmission band, a frequency-domain location, an initial location of an Orthogonal Frequency Division Multiplexing (OFDM) symbol of the PMCH, a transmission subframe cluster of the
(Continued)

PMCH, a number of transmission layers or used port indexes and a number of ports of the PMCH and MBMS reference signal pattern information.

8 Claims, 7 Drawing Sheets

(51) Int. Cl.
  *H04W 72/00* (2009.01)
  *H04L 5/00* (2006.01)
(52) U.S. Cl.
  CPC ......... *H04L 5/0091* (2013.01); *H04W 72/005* (2013.01); *H04L 5/0014* (2013.01)

(56) References Cited

U.S. PATENT DOCUMENTS

| | | | | |
|---|---|---|---|---|
| 2008/0045224 | A1* | 2/2008 | Lu | H04W 72/005 455/446 |
| 2009/0073908 | A1* | 3/2009 | Cai | H04W 48/12 370/312 |
| 2011/0026480 | A1* | 2/2011 | Kim | H04B 7/0413 370/329 |
| 2012/0281610 | A1* | 11/2012 | Ai | H04W 8/205 370/312 |
| 2012/0287838 | A1* | 11/2012 | Zhang | H04W 76/40 370/312 |
| 2012/0314642 | A1* | 12/2012 | Xu | H04W 48/16 370/312 |
| 2013/0035129 | A1* | 2/2013 | Wei | H04W 4/06 455/517 |
| 2014/0086173 | A1* | 3/2014 | Sadeghi | H04L 5/005 370/329 |
| 2014/0204825 | A1* | 7/2014 | Ekpenyong | H04L 5/001 370/312 |
| 2015/0208208 | A1* | 7/2015 | You | H04W 4/06 370/312 |
| 2015/0208372 | A1* | 7/2015 | You | H04J 11/0069 370/350 |
| 2016/0013977 | A1* | 1/2016 | Hu | H04W 72/005 370/329 |
| 2017/0111884 | A1* | 4/2017 | Sadeghi | H04W 68/02 |

OTHER PUBLICATIONS

English Translation of the Written Opinion of the International Search Authority in international application No. PCT/CN2014/075526, dated Jul. 9, 2014.
Supplementary European Search Report in European application No. 14784914.5, dated Feb. 29, 2016.
Ericsson et al: "On EMBMS and EPMCH operations for NCT", 3GPP Draft ; R1-131451, 3rd Generation Partnership Project (3GPP), Mobile Competence Centre ; 650, Route Des Lucioles ; F-06921 Sophiaantipolis Cedex; France, vol. RAN WG1, no. Chicago, USA; Apr. 15, 2013-Apr. 19, 2013 Apr. 7, 2013 (Apr. 7, 2013), XP050697413,Retrieved from the Internet: URL: http://www.3gpp.org/ftp/tsg_ranIWG1_RI1/TSGR1_72b/Docs/ [retrieved on Apr. 7, 2013] * Sections 1-3; figure 1 *, mailed on Apr. 7, 2013.
Huawei et al: "PMCH on NCT", 3GPP Draft; R1-130878, 3rd Generation Partnership Project (3GPP) , Mobile Competence Centre; 650, Route Des Lucioles ; F-06921 Sophiaantipolis Cedex ; France, vol. RAN WG1, no. Chicago , USA; Apr. 15, 2013-Apr. 19, 2013 Apr. 6, 2013 (Apr. 6, 2013), XP050696880,Retrieved from the Internet: URL: http://www.3gpp.org/ftp/tsg_ranIWG1_RL1/TSGR1_72b/Docs/ [retrieved on Apr. 6, 2013] * Sections 1-4; figure 1-2 *, mailed on Apr. 6, 2013.
Huawei et al: "Views on multiplex ing of control channel and PMCH for NCT", 3GPP Draft; R1-130444 , 3rd Generation Partnership Project (3GPP) , Mobile Competence Centre ; 650, Route Des Lucioles ; F-06921 Sophiaantipolis Cedex ; France, vol. RAN WG1, No. S1. Julian ; Jan. 28, 2013-Feb. 1, 2013 Jan. 19, 2013 (Jan. 19, 2013), XP050663727, Retrieved from the Internet: URL: http://www.3gpp.org/ftp/tsg_ranIWG1_RL1/TSGR1_72/Docs/ [retrieved on Jan. 19, 2013] * Sections 1-4; figure 1-2 *.
ZTE: "Discussion on ePDCCH restriction subframe clusters", 3rd Draft; R1-123376 Discussion on EPDCCH Restriction Subframe Clusters, 3rd Generation Partnership Project (3GPP), Mobile Competence Centre; 650, Route Des Lucioles ; F-06921 Sophiaantipolis Cedex, vol. RAN WG1, no. Qingdao, China; Aug. 13, 2012-Aug. 17, 2012 Aug. 5, 2012 (Aug. 5, 2012), XP050661264, Retrieved from the Internet: URL: http://www.3gpp.org/ftp/tsg_ranIWG1_RL1/TSGR1_70/Docs/ [retrieved on Aug. 5, 2012] * Sections 1-2 *.

* cited by examiner

One Subframe

One Subframe

PMCH/MBMS antenna port $l=0$  $l=5$ $l=0$  $l=5$ even-numbered slots | odd-numbered slots PMCH/MBMS antenna port

METHOD AND SYSTEM FOR CONFIGURING, SENDING AND RECEIVING PHYSICAL MULTICAST CHANNEL

TECHNICAL FIELD

The disclosure relates to a Long Term Evolution Advanced (LTE-Advanced) system, and in particular to a method and a system for configuring a Physical Multicast Channel (PMCH), a method and a system for acquiring a PMCH configuration and methods and systems for sending and receiving a channel based on the PMCH configuration.

BACKGROUND

In the LTE Release 8/9 (R8/9) protocols, in order to measure quality of a channel and demodulate a received data symbol, a Common Reference Signal (CRS) is designed. A User Equipment (UE) may measure the channel through the CRS to determine to perform cell reselection and handover to a target cell, and the quality of the channel is measured in a connected state of the UE. When the level of interference is high, a physical layer may be disconnected through a high-layer related radio link connection failure signalling. In LTE R10, in order to further increase an average spectrum utilization rate of a cell and an edge spectrum utilization rate of the cell as well as throughput of each UE, two reference signals are defined respectively: a Channel State Information Reference Signal (CSI-RS) and a Demodulation Reference Signal (DMRS), wherein the CSI-RS is configured for channel measurement, and by the measurement of the CSI-RS, a Precoding Matrix Indicator (PMI), a Channel Quality Indicator (CQI) and a Rank Indicator (RI), which are required to be fed back to an evolved Node B (eNB) by the UE, may be calculated. The DMRS may enable the UE to transparently receive DownLink (DL) data without knowing a precoding weight applicable to the base station side, so that a load of a Physical Downlink Control Channel (PDCCH) may be reduced, and meanwhile limitations of a codebook to the weight can be reduced. In addition, dynamic transparent switching between Single User-Multiple Input and Multiple Output (SU-MIMO) and Multiple User-Multiple Input and Multiple Output (MU-MIMO) is supported by the DMRS, and DMRS-based interference estimation is supported, so that interference elimination performance of a receiving side can be greatly improved.

The problem of enhanced sending of a Multimedia Broadcast and Multicast Service (MBMS) in a New Carrier Type (NCT) is not involved in discussions about the R10 and R11 protocols, and it is proposed that an MBMS may be sent in a NCT in the R12 protocol. If a NCT supports the sending of an MBMS in the R12 protocol, it is necessary to determine problems to be solved for the sending of the MBMS in the R12 protocol. First, it is necessary to consider whether multilayer transmission is required to be supported or not if an MBMS is sent in a NCT and how to support multilayer transmission by a reference signal and related control signalling if multilayer transmission is supported. Second, it is necessary to consider whether a PMCH reference signal in the NCT is required to be enhanced or not even in case of single-layer transmission because the first three Orthogonal Frequency Division Multiplexing (OFDM) symbols of the NCT are not configured to transmit a PDCCH. Third, in consideration of capability of the NCT and a compatible carrier in co-channel transmission, it is necessary to make further researches on how to ensure related space combination of the NCT and the compatible carrier. Fourth, if the MBMS is transmitted in the NCT, only an Enhanced Physical Downlink Control Channel (EPDCCH) is utilized for transmission in the NCT because there is no PDCCH area in the NCT, but a PMCH service is sent with the whole band in R10, and thus a subframe for transmitting the PMCH service cannot schedule an UpLink (UL) service corresponding to the NCT, which results in waste of an UL resource.

SUMMARY

In view of this, in order to solve the above problems, the embodiments of the disclosure provide a method and a system for configuring a Physical Multicast Channel (PMCH), a method and a system for acquiring a PMCH configuration and methods and systems for sending and receiving a channel based on the PMCH configuration.

To this end, the technical solutions of the embodiments of the disclosure are implemented as follows.

A method for configuring a PMCH is provided, including:
a base station configures information for a PMCH or an MBMS through a high-layer signalling and/or a predefinition and/or a MCCH, wherein the configured information is at least one of a transmission band, a frequency-domain location, an initial location of an OFDM symbol of the PMCH, a transmission subframe cluster of the PMCH, a number of transmission layers or used port indexes and a number of ports of the PMCH, and MBMS reference signal pattern information.

In an aspect, the method further includes that: when subframes configured by the base station to transmit the PMCH form more than one subframe cluster, the base station may independently configure at least one of the transmission band, the frequency-domain location, the initial location of the OFDM symbol of the PMCH or the MBMS, the number of transmission layers or the used port indexes and the number of ports of the PMCH or the MBMS and the PMCH or MBMS reference signal pattern information for transmission of the PMCH or the MBMS in different subframe clusters.

In an aspect, the method further includes that: the base station may independently configure at least one of the transmission band, the frequency-domain location, the initial location of the OFDM symbol of the PMCH or the MBMS, the transmission subframe cluster of the PMCH or the MBMS, the number of transmission layers or the used port indexes and the number of ports of the PMCH or the MBMS and the PMCH or MBMS reference signal pattern information for different types of MBMSs.

A system for configuring a PMCH is provided, which includes: a first configuration unit, located on a base station side and configured to configure at least one of a transmission band, a frequency-domain location, an initial location of an OFDM symbol of the PMCH, a transmission subframe cluster of the PMCH, a number of transmission layers or used port indexes and a number of ports of the PMCH and MBMS reference signal pattern information for the PMCH or the MBMS through a high-layer signalling and/or a predefinition and/or a MCCH.

When the first configuration unit executes processing, a Central Processing Unit (CPU), a Digital Signal Processor (DSP) or a Field-Programmable Gate Array (FPGA) may be adopted for implementation.

In an aspect, the first configuration unit is further configured to, under the condition that subframes configured by the base station to transmit the PMCH form more than one subframe cluster, independently configure at least one of the transmission band, the frequency-domain location, the initial location of the OFDM symbol of the PMCH or the MBMS, the number of transmission layers or the used port indexes and the number of ports of the PMCH or the MBMS and the PMCH or MBMS reference signal pattern information for transmission of the PMCH or the MBMS in different subframe clusters.

In an aspect, the first configuration unit is further configured to independently configure at least one of the transmission band, the frequency-domain location, the initial location of the OFDM symbol of the PMCH or the MBMS, the transmission subframe cluster of the PMCH or the MBMS, the number of transmission layers or the used port indexes and the number of ports of the PMCH or the MBMS and the PMCH or MBMS reference signal pattern information for different types of MBMSs.

A method for sending a channel based on a PMCH configuration is provided, which includes that: a base station sends a PMCH and/or an EPDCCH and/or an MCCH according to Downlink Control Information (DCI) or pre-definition indication.

Herein, when a carrier configuration of the base station is an NCT and a subframe for sending the DCI is a PMCH or MBMS subframe, the base station sends the DCI on another configured carrier related to the NCT.

Herein, the DCI includes at least one piece of the following information:

a DL grant: at least including DCI Format 1A, DCI Format 2B, DCI Format 2C and DCI Format 2D;

an UL grant: at least including DCI Format 0, DCI Format 4 and an enhanced possible new DCI format; and a PHICH/EPHICH/CSS control channel.

Herein, when a current subframe sent by the base station is a PMCH or MBMS subframe, the base station does not send the DCI in the current subframe, and the base station sends the DCI in the current subframe and/or the next X PMCH or MBMS subframes over a previous subframe, and indicates the subframe corresponding to the DCI to a terminal through N bits in the DCI, wherein 0<X<5, and 0<N<4.

Herein, when the current subframe sent by the base station is a PMCH or MBMS subframe, the base station determines the number of symbols for sending the EPDCCH according to a configured initial location of the PMCH or an MBMS; and when the first one or two OFDM symbols in a subframe are not configured to send the PMCH, the base station may send the EPDCCH via the first one or two OFDM symbols.

Herein, when the current subframe sent by the base station is a PMCH or MBMS subframe, the base station always sends the MCCH at a port corresponding to a first layer in the PMCH subframe.

Herein, the method further includes that: when a port corresponding to an MBMS data layer is the same as the port adopted for the MCCH, the base station does not map MBMS data on a resource element of the MCCH; and when the port corresponding to the MBMS data layer is different from the port adopted for the MCCH, the base station may map the MBMS data on the resource element of the MCCH.

Herein, the method further includes that: the base station always does not map the MBMS data on the resource element of the MCCH.

A system for sending a channel based on a PMCH configuration is provided, which includes: a first channel sending unit, located on a base station side and configured to send a PMCH and/or an EPDCCH and/or an MCCH according to DCI or predefinition indication.

When the first channel sending unit executes processing, a CPU, a DSP or an FPGA may be adopted for implementation.

Herein, the first channel sending unit is further configured to, when a carrier configuration of the base station is an NCT and a subframe for sending the DCI is a PMCH or MBMS subframe, send the DCI on another configured carrier related to the NCT according to the DCI indication.

Herein, the DCI includes at least one piece of the following information:

a DL grant: at least including DCI Format 1A, DCI Format 2B, DCI Format 2C and DCI Format 2D;

a UL grant: at least including DCI Format 0, DCI Format 4 and an enhanced possible new DCI format; and a PHICH/EPHICH/CSS control channel.

Herein, the first channel sending unit is further configured to, when a current subframe sent by the base station is a PMCH or MBMS subframe, not send the DCI over the current subframe according to the DCI indicator, send the DCI in the current subframe and/or the next X PMCH or MBMS subframes over a previous subframe, and indicate the subframe corresponding to the DCI to a terminal via N bits in the DCI, wherein 0<X<5, and 0<N<4.

Herein, the first channel sending unit is further configured to, when the current subframe sent by the base station is a PMCH or MBMS subframe, determine the number of symbols for sending the EPDCCH according to a configured initial location of the PMCH or an MBMS according to the DCI indication; and when the first one or two OFDM symbols in a subframe are not configured to send the PMCH, send the EPDCCH via the first one or two OFDM symbols.

Herein, the first channel sending unit is further configured to, when the current subframe sent by the base station is a PMCH or MBMS subframe, always send the MCCH at a port corresponding to a first layer in the PMCH subframe according to the predefinition indication.

Herein, the first channel sending unit is further configured to, when a port corresponding to an MBMS data layer is the same as the port adopted for the MCCH, not map MBMS data on a resource element of the MCCH; and when the port corresponding to the MBMS data layer is different from the port adopted for the MCCH, map the MBMS data on the resource element of the MCCH.

Herein, the first channel sending unit is further configured to always not map the MBMS data on the resource element of the MCCH.

A method for acquiring a PMCH configuration is provided, which includes that: a terminal acquires, by receiving a high-layer signalling and/or a predefinition and/or an MCCH, at least one of a transmission band, a frequency-domain location, an initial location of an OFDM symbol of a PMCH or an MBMS, a transmission subframe cluster of the PMCH or the MBMS, a number of transmission layers or used port indexes and a number of ports of the PMCH or the MBMS and PMCH or MBMS reference signal pattern information, which are configured for the PMCH or the MBMS by a base station.

Herein, the method further includes that: when the terminal acquires more than one PMCH or MBMS subframe cluster through the high-layer signalling, the terminal may independently acquire at least one of the transmission band, the frequency-domain location, the initial location of the OFDM symbol of the PMCH or the MBMS, the number of transmission layers or the used port indexes and the number of ports of the PMCH or the MBMS and the PMCH or MBMS reference signal pattern information, which are configured by the base station, for transmission of the PMCH or the MBMS in different subframe clusters.

Herein, the method further includes that: the terminal may independently acquire at least one of the transmission band, the frequency-domain location, the initial location of the OFDM symbol of the PMCH or the MBMS, the transmission subframe cluster of the PMCH or the MBMS, the number of transmission layers or the used port indexes and the number of ports of the PMCH or the MBMS and the PMCH or MBMS reference signal pattern information, which are configured by the base station, for different types of MBMSs.

A system for acquiring a PMCH configuration is provided, which includes: a first acquisition unit, located on a terminal side and configured to acquire, by receiving a high-layer signalling and/or a predefinition and/or an MCCH, at least one of a transmission band, a frequency-domain location, an initial location of an OFDM symbol of a PMCH or an MBMS, a transmission subframe cluster of the PMCH or the MBMS, a number of transmission layers or used port indexes and a number of ports of the PMCH or the MBMS and PMCH or MBMS reference signal pattern information, which are configured for the PMCH or the MBMS by a base station.

When the first acquisition unit executes processing, a CPU, a DSP or an FPGA may be adopted for implementation.

Herein, the first acquisition unit is further configured to, when a terminal acquires more than one PMCH or MBMS subframe cluster through the high-layer signalling, independently acquire at least one of the transmission band, the frequency-domain location, the initial location of the OFDM symbol of the PMCH or the MBMS, the number of transmission layers or the used port indexes and the number of ports of the PMCH or the MBMS and the PMCH or MBMS reference signal pattern information, which are configured by the base station, for transmission of the PMCH or the MBMS in different subframe clusters.

Herein, the first acquisition unit is further configured to independently acquire at least one of the transmission band, the frequency-domain location, the initial location of the OFDM symbol of the PMCH or the MBMS, the transmission subframe cluster of the PMCH or the MBMS, the number of transmission layers or the used port indexes and the number of ports of the PMCH or the MBMS and the PMCH or MBMS reference signal pattern information, which are configured by the base station, for different types of MBMSs.

A method for receiving a channel based on a PMCH configuration is provided, which includes that:

a terminal receives a PMCH and/or an EPDCCH and/or an MCCH according to DCI or predefinition indication configured by a base station.

Herein, when a carrier configuration for receiving a DL subframe by the terminal is an NCT and a subframe receiving DCI is a PMCH or MBMS subframe, the terminal receives the DCI on another configured carrier related to the NCT.

Herein, the DCI includes at least one piece of the following information:

a DL grant: at least including DCI Format 1A, DCI Format 2B, DCI Format 2C and DCI Format 2D;

a UL grant: at least including DCI Format 0, DCI Format 4 and an enhanced possible new DCI format; and a PHICH/EPHICH/CSS control channel.

Herein, when a current subframe received by the terminal is a PMCH or MBMS subframe, the terminal receives the DCI in the current subframe and/or the next X PMCH or MBMS subframes over a previous subframe, and acquires the subframe corresponding to the DCI by detecting N bits in the DCI, wherein 0<X<5, and 0<N<4.

Herein, when the current DL subframe received by the terminal is a PMCH or MBMS subframe, the terminal always receives the MCCH at a port corresponding to a first layer in the PMCH subframe or the MBMS subframe.

Herein, the method further includes that: when a port corresponding to an MBMS data layer is the same as the port adopted for the MCCH, the terminal does not receive MBMS data on a resource element of the MCCH; and when the port corresponding to the MBMS data layer is different from the port adopted for the MCCH, the terminal may receive the MBMS data on the resource element of the MCCH.

Herein, the method further includes that: the terminal always does not receive the MBMS data on the resource element of the MCCH.

A system for receiving a channel based on a PMCH configuration is provided, which includes: a first channel receiving unit, located on a terminal side and configured to receive a PMCH and/or an EPDCCH and/or an MCCH according to DCI or predefinition indication configured by a base station.

When the first channel receiving unit executes processing, a CPU, a DSP or an FPGA may be adopted for implementation.

Herein, the first channel receiving unit is further configured to, when a carrier configuration for receiving a DL subframe by a terminal is an NCT and a subframe receiving the DCI is a PMCH or MBMS subframe, receive the DCI on another configured carrier related to the NCT according to the DCI indication.

Herein, the DCI includes at least one piece of the following information:

a DL grant: at least including DCI Format 1A, DCI Format 2B, DCI Format 2C and DCI Format 2D;

a UL grant: at least including DCI Format 0, DCI Format 4 and an enhanced possible new DCI forma; and a PHICH/EPHICH/CSS control channel.

Herein, the first channel receiving unit is further configured to, when a current subframe received by the terminal is a PMCH or MBMS subframe, receive the DCI in the current subframe and/or the next X PMCH or MBMS subframes over a previous subframe according to the DCI indication, and acquire the subframe corresponding to the DCI by detecting N bits in the DCI, wherein 0<X<5, and 0<N<4.

Herein, the first channel receiving unit is further configured to, when the current DL subframe received by the terminal is a PMCH or MBMS subframe, always receive the MCCH at a port corresponding to a first layer in the PMCH subframe or the MBMS subframe according to the predefinition indication.

Herein, the first channel receiving unit is further configured to, when a port corresponding to an MBMS data layer is the same as the port adopted for the MCCH, not receive MBMS data on a resource element of the MCCH; and when the port corresponding to the MBMS data layer is different from the port adopted for the MCCH, receive the MBMS data on the resource element of the MCCH.

Herein, the first channel receiving unit is further configured to always not receive the MBMS data on the resource element of the MCCH.

According to the method for configuring the PMCH in the embodiments of the disclosure, the base station configures at least one of the transmission band, the frequency-domain location, the initial location of the OFDM symbol of the PMCH, the transmission subframe cluster of the PMCH, the number of transmission layers or the used port indexes and the number of ports of the PMCH and the MBMS reference signal pattern information for the PMCH or the MBMS through the high-layer signalling and/or the predefinition and/or the Multicast Control Channel (MCCH). By the disclosure, a problem about sending the MBMS during NCT enhancement may be solved.

DETAILED DESCRIPTION

Figure 1:
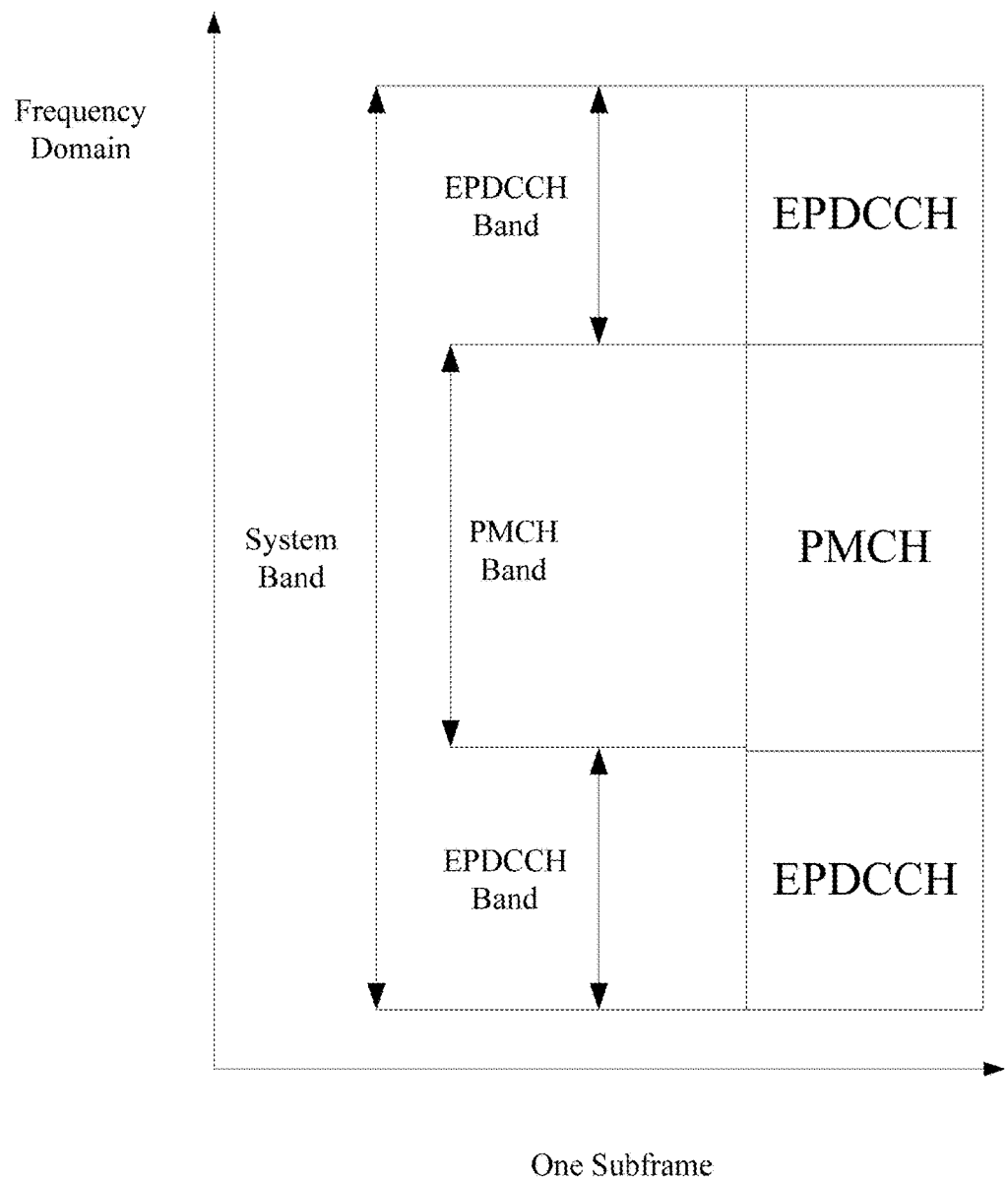
FIG. 1 is diagram of frequency-domain resource location and band allocation of an EPDCCH and a PMCH according to the disclosure.

It is noted here that an MCCH in the disclosure is control channel information sent in a PMCH. MBMS data refers to data transmitting MBMS information, and at least includes MBMS Traffic Channel (MTCH) information.

The embodiments of the disclosure mainly include the following contents.

A method for configuring a PMCH includes that: a base station configures at least one of the following information for a PMCH or an MBMS through a high-layer signalling and/or a predefinition and/or an MCCH:
1: a transmission band;
2: a frequency-domain location;
3: an initial location of an OFDM symbol of the PMCH;
4: a transmission subframe cluster of the PMCH;
5: a number of transmission layers or used port indexes and a number of ports of the PMCH or the MBMS; and
6: MBMS reference signal pattern information.

Preferably, when subframes configured by the base station to transmit the PMCH form more than one subframe cluster, the base station may independently configure at least one of the following information for transmission of the PMCH or the MBMS in different subframe clusters:
1: the transmission band;
2: the frequency-domain location;
3: the initial location of the OFDM symbol of the PMCH or the MBMS;
4: the number of transmission layers or used port indexes and the number of ports of the PMCH or the MBMS; and
5: the PMCH or MBMS reference signal pattern information.

Preferably, the base station may independently configure at least one of the following information for different types of MBMSs:
1: the transmission band;
2: the frequency-domain location;
3: the initial location of the OFDM symbol of the PMCH or the MBMS;
4: the transmission subframe cluster of the PMCH or the MBMS;
5: the number of transmission layers or used port indexes and the number of ports of the PMCH or the MBMS; and
6: the PMCH or MBMS reference signal pattern information.

A method for sending a channel based on a PMCH configuration includes that a base station sends a PMCH and/or an EPDCCH and/or an MCCH according to DCI or predefinition indication.

For the DCI indication, DCI is sent, and when a carrier configuration of the base station is an NCT and a subframe for sending the DCI is a PMCH or MBMS subframe, the base station sends the DCI on another configured carrier related to the NCT.

Preferably, the DCI includes at least one piece of the following information.
1. a DL Grant Herein, the DL Grant at least includes DCI Format 1A, DCI Format 2B, DCI Format 2C and DCI Format 2D, and the DCI is an abbreviation of DownLink control information.

2. an UL Grant

Herein, the UL Grant at least includes DCI Format 0, DCI Format 4 and an enhanced possible new DCI format.

3. a Physical Hybrid Indicator Channel/Enhanced Physical Hybrid Indicator Channel/Common Search Space (PH-ICH/EPHICH/CSS) control channel.

For the DCI indication, the DCI is sent, and when a current DL subframe sent by the base station is a PMCH or MBMS subframe, the base station does not send the DCI over the current subframe, and the base station sends the DCI in the current subframe and/or the next X PMCH or MBMS subframes over a previous subframe, and indicates the subframe corresponding to the DCI to a terminal via N bits in the DCI, wherein 0<X<5 and 0<N<4.

For the DCI indication, the DCI is sent. The base station determines the number of symbols for sending the EPDCCH according to a configured initial location of the PMCH or an MBMS when the current DL subframe sent by the base station is a PMCH or MBMS subframe, and when the first one or two OFDM symbols in a subframe are not configured to send the PMCH, the base station may send the EPDCCH via the first one or two OFDM symbols.

For the predefinition indication, the MCCH and the PMCH are sent, and when the current DL subframe sent by the base station is a PMCH or MBMS subframe, the base station always sends the MCCH at a port corresponding to a first layer in the PMCH subframe.

Preferably, when a port corresponding to an MBMS data layer is the same as the port adopted for the MCCH, the base station does not map MBMS data on a resource element of the MCCH, and when the port corresponding to the MBMS data layer is different from the port adopted for the MCCH, the base station may map the MBMS data on the resource element of the MCCH.

Preferably, the base station always does not map the MBMS data on the resource element of the MCCH.

A method for acquiring a PMCH configuration includes that a terminal acquires at least one of the following information configured for a PMCH or an MBMS by receiving a high-layer signalling and/or a predefinition and/or an MCCH:

1: a transmission band;
2: a frequency-domain location;
3: an initial location of an OFDM symbol of the PMCH or the MBMS;
4: a transmission subframe cluster of the PMCH or the MBMS;
5: a number of transmission layers or used port indexes and a number of ports of the PMCH or the MBMS; and
6: PMCH or MBMS reference signal pattern information.

Preferably, when the terminal acquires more than one PMCH or MBMS subframe cluster through the high-layer signalling, the terminal may independently acquire at least one of the following information for transmission of the PMCH or the MBMS in different subframe clusters:

1: the transmission band;
2: the frequency-domain location;
3: the initial location of the OFDM symbol of the PMCH or the MBMS;
4: the number of transmission layers or the used port indexes and the number of ports of the PMCH or the MBMS; and
5: the PMCH or MBMS reference signal pattern information.

Preferably, the terminal may independently acquire at least one of the following information for different types of MBMSs:

1: the transmission band;
2: the frequency-domain location;
3: the initial location of the OFDM symbol of the PMCH or the MBMS;
4: the transmission subframe cluster of the PMCH or the MBMS;
5: the number of transmission layers or the used port indexes and the number of ports of the PMCH or the MBMS; and
6: the PMCH or MBMS reference signal pattern information.

A method for receiving a channel based on a PMCH configuration includes that a terminal receives a PMCH and/or an EPDCCH and/or an MCCH according to DCI or predefinition indication configured by a base station.

For the DCI indication, the DCI is received, and when a carrier configuration for receiving a DL subframe by the terminal is an NCT and a subframe for receiving the DCI is a PMCH or MBMS subframe, the terminal receives the DCI on another configured carrier related to the NCT.

Preferably, the DCI includes at least one piece of the following information:

1: a DL Grant: at least including DCI Format 1A, DCI Format 2B, DCI Format 2C and DCI Format 2D;
2: an UL Grant: at least including DCI Format 0, DCI Format 4 and an enhanced possible new DCI format; and
3: a PHICH/EPHICH/CSS control channel.

For the DCI indication, the DCI is received, and when a current subframe received by the terminal is a PMCH or MBMS subframe, the terminal receives the DCI in the current subframe and/or the next X PMCH or MBMS subframes over a previous subframe, and acquires the subframe corresponding to the DCI by receiving N bits in the DCI, wherein $0<X<5$ and $0<N<4$.

For the predefinition indication, the MCCH and the PMCH are received, and when the current DL subframe received by the terminal is a PMCH or MBMS subframe, the terminal always receives the MCCH at a port corresponding to a first layer in the PMCH subframe or the MBMS subframe.

Preferably, when a port corresponding to an MBMS data layer is the same as the port adopted for the MCCH, the terminal does not receive MBMS data on a resource element of the MCCH, and when the port corresponding to the MBMS data layer is different from the port adopted for the MCCH, the terminal receives the MBMS data on the resource element of the MCCH.

Preferably, the terminal always does not receive the MBMS data on the resource element of the MCCH.

Systems corresponding to the abovementioned methods are described as follows.

A system for configuring a PMCH includes a first configuration unit, located on a base station side and configured to configure at least one of a transmission band, a frequency-domain location, an initial location of an OFDM symbol of a PMCH, a transmission subframe cluster of the PMCH, a number of transmission layers or used port indexes and a number of ports of the PMCH and MBMS reference signal pattern information for the PMCH or an MBMS through a high-layer signalling and/or a predefinition and/or an MCCH.

Preferably, the first configuration unit is further configured to, under the condition that subframes configured by the base station to transmit the PMCH form more than one subframe cluster, independently configure at least one of the transmission band, the frequency-domain location, the initial location of the OFDM symbol of the PMCH or the MBMS, the number of transmission layers or the used port indexes and the number of ports of the PMCH or the MBMS and the PMCH or MBMS reference signal pattern information for transmission of the PMCH or the MBMS in different subframe clusters.

Preferably, the first configuration unit is further configured to independently configure at least one of the transmission band, the frequency-domain location, the initial location of the OFDM symbol of the PMCH or the MBMS, the transmission subframe cluster of the PMCH or the MBMS, the number of transmission layers or the used port indexes and the number of ports of the PMCH or the MBMS and the PMCH or MBMS reference signal pattern information for different types of MBMSs.

A system for sending a channel based on the PMCH configuration includes a first channel sending unit located on a base station side and configured to send a PMCH and/or an EPDCCH and/or an MCCH according to DCI or predefinition indication.

Preferably, the first channel sending unit is further configured to, when a carrier configuration of the base station is an NCT and a subframe for sending the DCI is a PMCH or MBMS subframe, send the DCI on another configured carrier related to the NCT according to the DCI indication.

Preferably, the first channel sending unit is further configured to, when a current DL subframe sent by the base station is a PMCH or MBMS subframe, not send the DCI over the current subframe according to the DCI indication, send the DCI in the current subframe and/or the next X PMCH or MBMS subframes in a previous subframe, and indicate the subframe corresponding to the DCI to a terminal via N bits in the DCI, wherein 0<X<5, and 0<N<4.

Preferably, the first channel sending unit is further configured to, when the current DL subframe sent by the base station is a PMCH or MBMS subframe, determine the number of symbols for sending the EPDCCH according to a configured initial location of the PMCH or an MBMS according to the DCI indication; and when the first one or two OFDM symbols in a subframe are not configured to send the PMCH, send the EPDCCH via the first one or two OFDM symbols.

Preferably, the first channel sending unit is further configured to, when the current DL subframe sent by the base station is a PMCH or MBMS subframe, always send the MCCH at a port corresponding to a first layer in the PMCH subframe according to the predefinition indication.

A system for acquiring a PMCH configuration includes a first acquisition unit located on a terminal side and configured to acquire, by receiving a high-layer signalling and/or a predefinition and/or an MCCH, at least one of a transmission band, a frequency-domain location, an initial location of an OFDM symbol of a PMCH or an MBMS, a transmission subframe cluster of the PMCH or the MBMS, a number of transmission layers or used port indexes and a number of ports of the PMCH or the MBMS and PMCH or MBMS reference signal pattern information, which are configured for the PMCH or the MBMS by a base station.

Preferably, the first acquisition unit is further configured to, when the terminal acquires more than one PMCH or MBMS subframe cluster through the high-layer signalling, independently acquire at least one of the transmission band, the frequency-domain location, the initial location of the OFDM symbol of the PMCH or the MBMS, the number of transmission layers or the used port indexes and the number of ports of the PMCH or the MBMS and the PMCH or MBMS reference signal pattern information, which are configured by the base station, for transmission of the PMCH or the MBMS in different subframe clusters.

Preferably, the first acquisition unit is further configured to independently acquire at least one of the transmission band, the frequency-domain location, the initial location of the OFDM symbol of the PMCH or the MBMS, the transmission subframe cluster of the PMCH or the MBMS, the number of transmission layers or the used port indexes and the number of ports of the PMCH or the MBMS and the PMCH or MBMS reference signal pattern information, which are configured by the base station, for different types of MBMSs.

A system for receiving a channel based on the PMCH configuration includes a first channel receiving unit, located on a terminal side and configured to receive a PMCH and/or an EPDCCH and/or an MCCH according to DCI or predefinition indication configured by a base station.

Preferably, the first channel receiving unit is further configured to, when a carrier configuration for receiving a DL subframe by the terminal is an NCT and a subframe for receiving the DCI is a PMCH or MBMS subframe, receive the DCI on another configured carrier related to the NCT according to the DCI indication.

Preferably, the first channel receiving unit is further configured to, when a current subframe received by the terminal is a PMCH or MBMS subframe, receive the DCI in the current subframe and/or the next X PMCH or MBMS subframes over a previous subframe according to the DCI indication, and acquire the subframe corresponding to the DCI by receiving N bits in the DCI, wherein 0<X<5, and 0<N<4.

Preferably, the first channel receiving unit is further configured to, when the current DL subframe received by the terminal is a PMCH or MBMS subframe, always receive the MCCH at a port corresponding to a first layer in the PMCH subframe or the MBMS subframe according to the predefinition indication.

Preferably, when a port corresponding to an MBMS data layer is the same as the port adopted for the MCCH, the terminal does not receive MBMS data on a resource element of the MCCH, and when the port corresponding to the MBMS data layer is different from the port adopted for the MCCH, the terminal receives the MBMS data on the resource element of the MCCH.

Preferably, the terminal always does not receive the MBMS data on the resource element of the MCCH.

From the above, by the embodiments of the disclosure, the problem of UL resource waste caused by the fact that a subframe may not schedule a corresponding UL resource if the subframe sends a PMCH in NCT enhancement for an MBMS is mainly solved. Moreover, if co-channel transmission of a PMCH with a compatible carrier is supported in an NCT, how to ensure a Single Frequency Network (SFN) characteristic of the PMCH becomes a problem. By the disclosure, the problem of incapability of a PMCH subframe in the NCT in scheduling an UL service is better solved and an UL resource utilization rate is increased. Moreover, MBMS data may be spatially combined since correspondence of a first few OFDM symbols is ensured during the co-channel transmission of the NCT and the compatible carrier.

The implementation of the technical solutions is further described in detail below with reference to the drawings.

The following OFDM indexes are numbered as 0~13 according to time-domain resources in a subframe, and subcarrier numbers are 0~11 in a resource block pair. The embodiments of the disclosure are not limited to various combinations of individual embodiments, and embodiments and solutions formed by the various combinations of individual embodiment shall still fall within the scope of protection of the disclosure. A PMCH in each of the following embodiments may also be an MBMS, and the configuration and implementation thereof may be based on a PMCH or MBMS type.

Herein, a base station may notify and indicate a terminal by adopting a 40-bit bitmap sequence for a subframe cluster high-layer signalling. The terminal may acquire subframe cluster configuration information by receiving the subframe cluster high-layer signalling of the 40-bit bitmap sequence.

Figure 11:
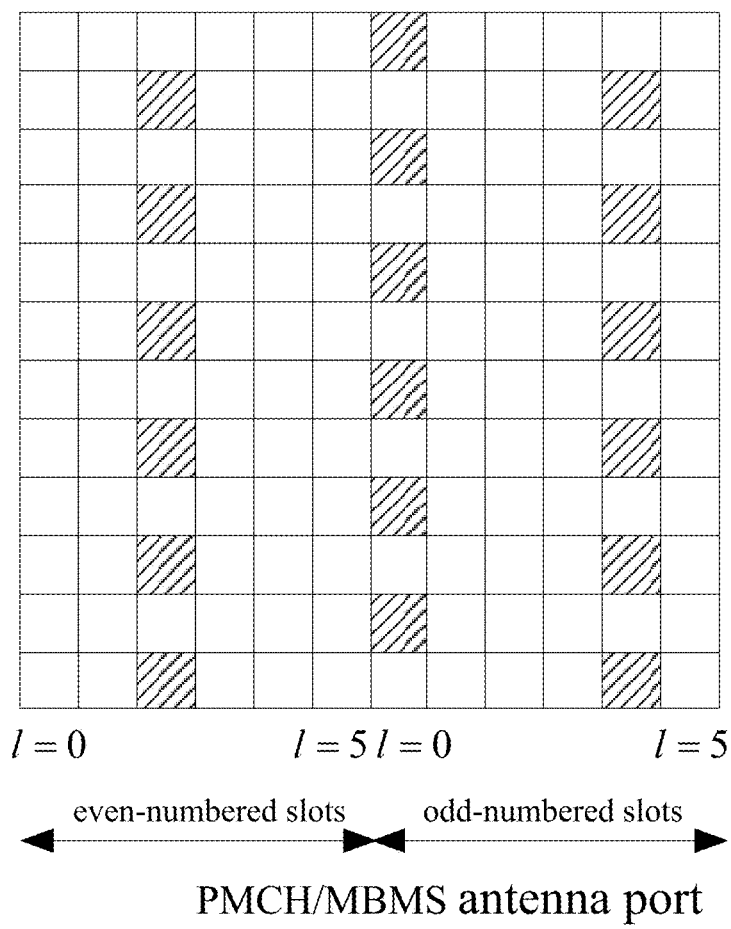
FIG. 11 is a diagram of a PMCH or MBMS reference signal pattern according to the disclosure.
Figure 12:
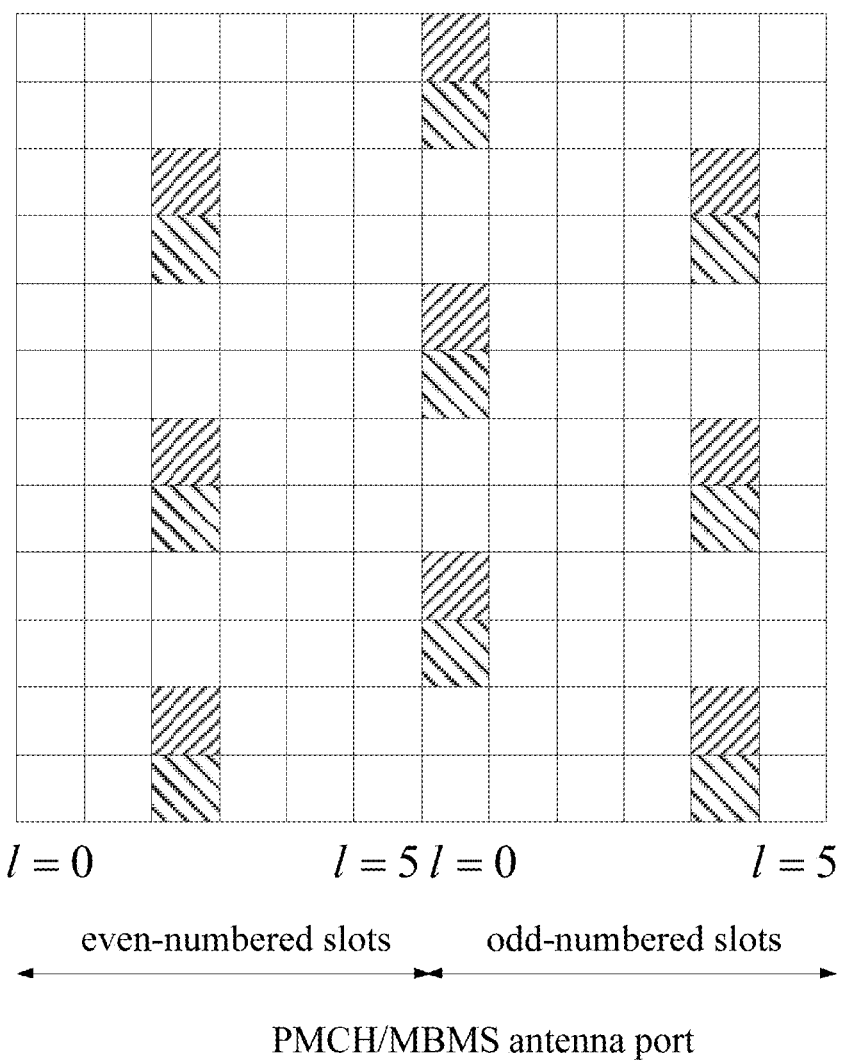
FIG. 12 is a diagram of a PMCH or MBMS reference signal pattern according to the disclosure.

PMCH or MBMS reference signal pattern information is mainly configured to indicate a reference signal pattern to be received by the terminal, and here, the terminal may be notified to adopt a reference signal pattern shown in FIG. 11 or FIG. 12 for receiving through indication information. The terminal learns to adopt the reference signal pattern shown in FIG. 11 or FIG. 12 for receiving by receiving the PMCH or MBMS reference signal pattern information.

Embodiment 1

Figure 2:
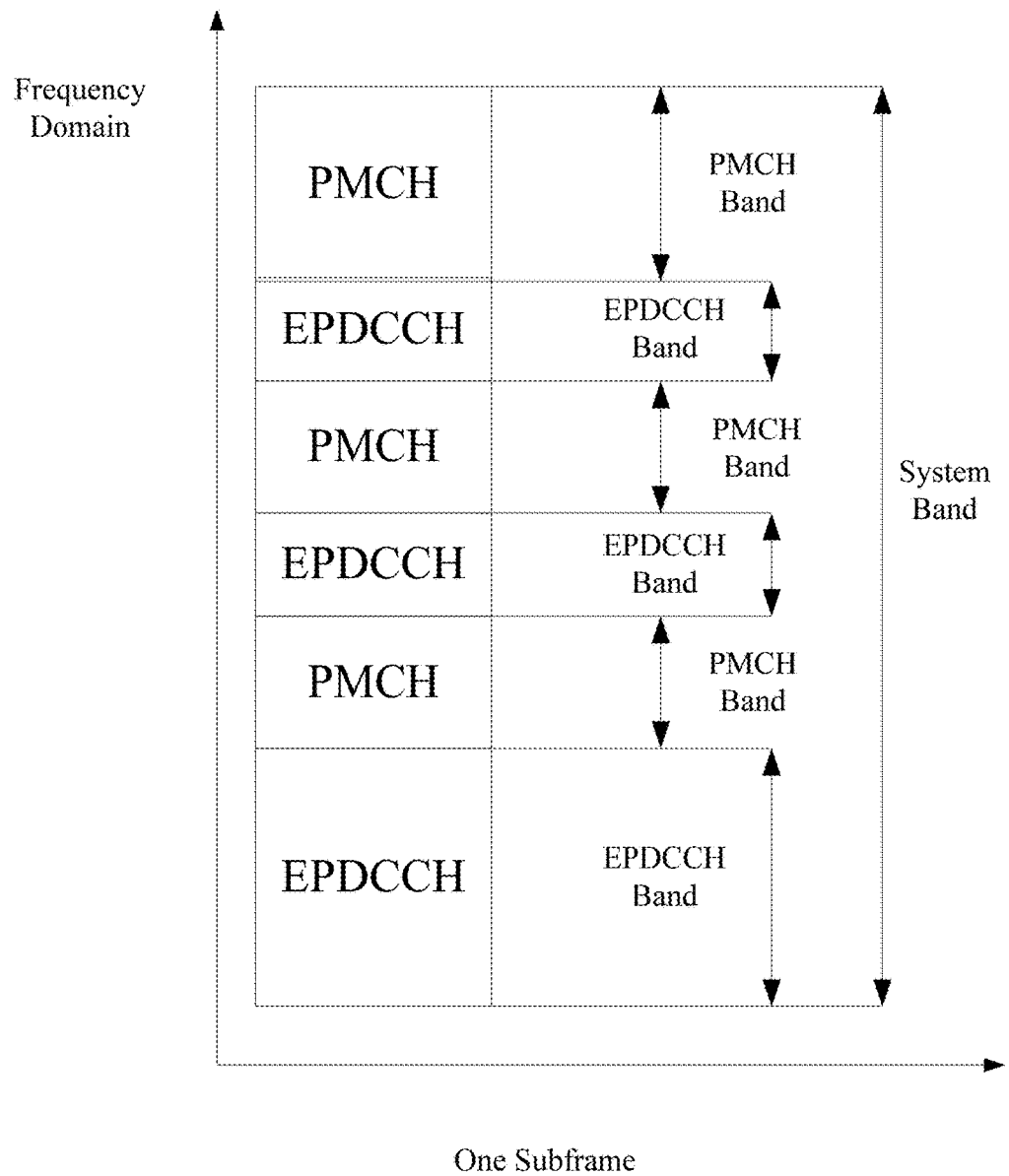
FIG. 2 is a diagram of frequency-domain resource location and band allocation of an EPDCCH and a PMCH according to the disclosure.

As shown in FIG. 1 and FIG. 2, in a PMCH subframe, a PMCH and an EPDCCH may be sent and received in one subframe in a frequency division multiplexing manner.

The base station configures a frequency-domain location and band occupied by the PMCH in the PMCH subframe through a high-layer signalling, and the terminal is aware of receiving the PMCH by receiving the high-layer signalling configured by the base station and then receives the PMCH in the corresponding subframe and frequency domain. In FIG. 1 and FIG. 2, One Subframe refers to a subframe, Frequency Domain refers to a frequency range, and Band refers to the band or the band width.

Embodiment 2

Figure 3:
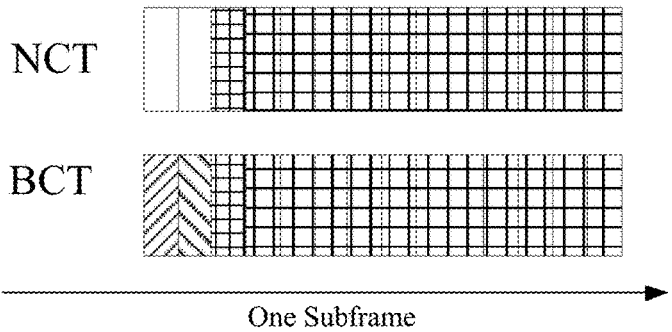
FIG. 3 is a diagram of configuration of an initial OFDM symbol of a PMCH in an NCT according to the disclosure.

As shown in FIG. 3, in a PMCH subframe, when a PMCH in an NCT is required to be spatially combined with a PMCH in a compatible carrier, it is necessary to avoid sending of the PMCH on the first two OFDM symbols of the NCT to ensure data resource alignment. At this time, the base station may notify an initial location of an OFDM symbol on the corresponding PMCH subframe to a terminal through a high-layer signalling. The initial location of the OFDM symbol includes at least one of the following values: 0, 1 and 2. In FIG. 3, the locations padded with ▨ are PDCCH OFDM symbols, the locations padded with ▦ are PMCH OFDM symbols, and the locations padded with ▢ are non-PMCH OFDM symbols.

The terminal acquires the initial location of the OFDM symbol on the corresponding PMCH subframe by receiving the high-layer signalling configured by the base station, thereby receiving the PMCH on a resource element where the PMCH is located.

Embodiment 3

Figure 4:
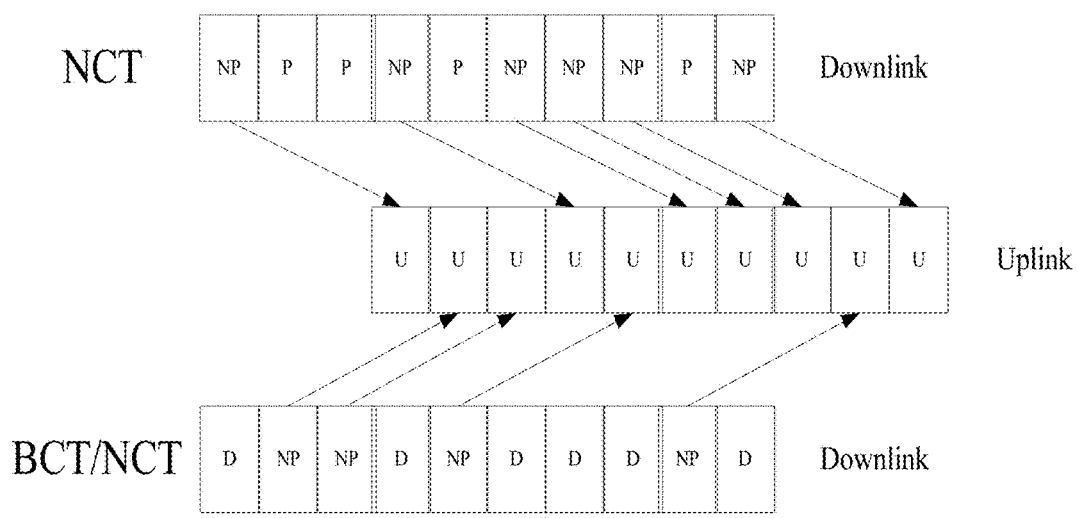
FIG. 4 is a diagram of scheduling an UL service in a PMCH subframe in an NCT via paired carriers according to the disclosure.

As shown in FIG. 4, a base station needs to configure a paired carrier for a corresponding NCT, and the paired carrier may be a compatible carrier or the NCT. When a DL subframe in the NCT is a PMCH subframe, the base station sends the DCI of the NCT on a current subframe where the paired carrier is located.

A terminal acquires a subframe location of the PMCH subframe by receiving a PMCH subframe cluster configured by the base station in the NCT, and acquires carrier configuration information by receiving the paired carrier configured by the base station. When the DL subframe in the NCT is a PMCH subframe, the terminal receives the DCI of the NCT on the current subframe where the paired carrier is located.

Herein, the DCI includes at least one of DL_Grant, UL_Grant and PHICH/EPHICH.

DL Grant at least includes DCI Format 1A, DCI Format 2B, DCI Format 2C and DCI Format 2D.

UL Grant at least includes DCI Format 0, DCI Format 4 and an enhanced possible new DCI format.

In FIG. 4, Downlink represents a downlink abbreviated as DL, Uplink represents an uplink abbreviated as UL, NP represents a non-PMCH subframe, U represents a UL subframe, P represents a PMCH subframe and D represents any DL subframe.

Embodiment 4

Figure 5:
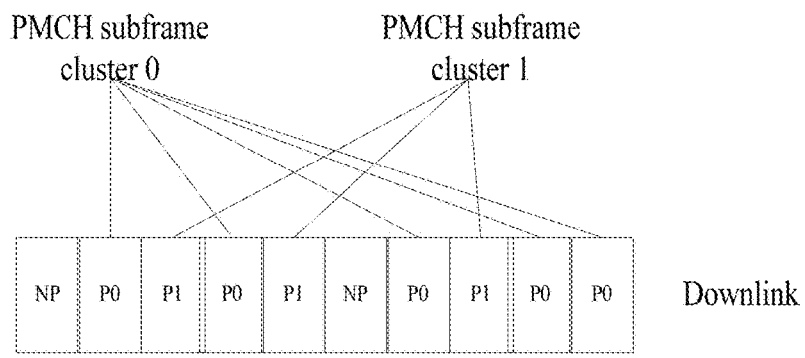
FIG. 5 is a diagram of configuration of a PMCH subframe cluster in an NCT according to the disclosure.

As shown in FIG. 5, a base station configures multiple PMCH subframe clusters through a high-layer signalling, each PMCH subframe cluster may include multiple PMCH subframes, and for different PMCH subframe clusters, the base station may independently configure at least one of the following information through the high-layer signalling:
 1: a transmission band;
 2: a frequency-domain location;
 3: an initial location of an OFDM symbol of a PMCH or an MBMS;
 4: a number of transmission layers or used port indexes and a number of ports of the PMCH or the MBMS; and
 5: PMCH or MBMS reference signal pattern information.

A terminal acquires the multiple configured PMCH subframe clusters by receiving the high-layer signalling, each PMCH subframe cluster may include multiple PMCH subframes, and for different PMCH subframe clusters, the terminal independently receives at least one of the following information:
 1: the transmission band;
 2: the frequency-domain location;
 3: the initial location of the OFDM symbol of the PMCH or the MBMS;
 4: the number of transmission layers or used port indexes and the number of ports of the PMCH or the MBMS; and
 5: the PMCH or MBMS reference signal pattern information.

When only the first subframe cluster is configured with the following information, all of the subframe clusters are processed according to the configuration of the first subframe cluster.

When the corresponding configuration information is not configured, an R11 PMCH method is adopted for sending and receiving.

In FIG. 5, Downlink represents a downlink abbreviated as DL, NP represents a non-PMCH subframe, P0 represents a PMCH subframe of PMCH subframe cluster 0, and P1 represents a PMCH subframe of PMCH subframe cluster 1.

Embodiment 5

Figure 6:
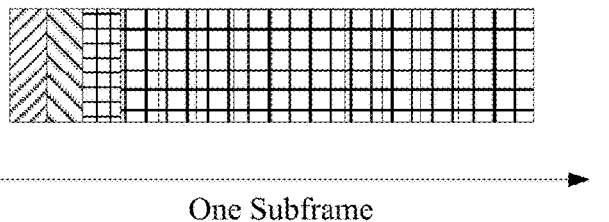
FIG. 6 is a diagram of sending and receiving an EPDCCH in a PMCH subframe in an NCT according to the disclosure.

As shown in FIG. 6, in a PMCH subframe, when a PMCH in an NCT is required to be spatially combined with a PMCH in a compatible carrier, it is necessary to avoid sending of the PMCH on the first two OFDM symbols of the NCT to ensure data resource alignment. At this time, the base station may notify an initial location of an OFDM symbol on the corresponding PMCH subframe to a terminal through a high-layer signalling. The initial location of the OFDM symbol includes at least one of the following values: 0, 1 and 2. When the value of the configured initial location is more than 0, the first OFDM symbol or the first two OFDM symbols may be configured to transmit an EPDCCH.

The terminal acquires the initial location of the OFDM symbol on the corresponding PMCH subframe by receiving the high-layer signalling configured by the base station, thereby receiving the PMCH on a resource element where the PMCH is located. When the value of the acquired initial location is more than 0, the first OFDM symbol or the first two OFDM symbols may be configured to receive the EPDCCH.

In FIG. 6, the locations padded with ▨ are EPDCCH OFDM symbols, and the locations padded with ▦ are PMCH OFDM symbols.

Embodiment 6

As shown in FIG. 6, in a PMCH subframe, a base station transmits an EPDCCH on the first OFDM symbol or the first two OFDM symbols.

A terminal acquires a location of a PMCH subframe through high-layer signalling configured by the base station, and then receives the EPDCCH on the first OFDM symbol or the first two OFDM symbols on the PMCH subframe.

In FIG. 6, the locations padded with ▨ are EPDCCH OFDM symbols, and the locations padded with ▦ are PMCH OFDM symbols.

Embodiment 7

Figure 7:
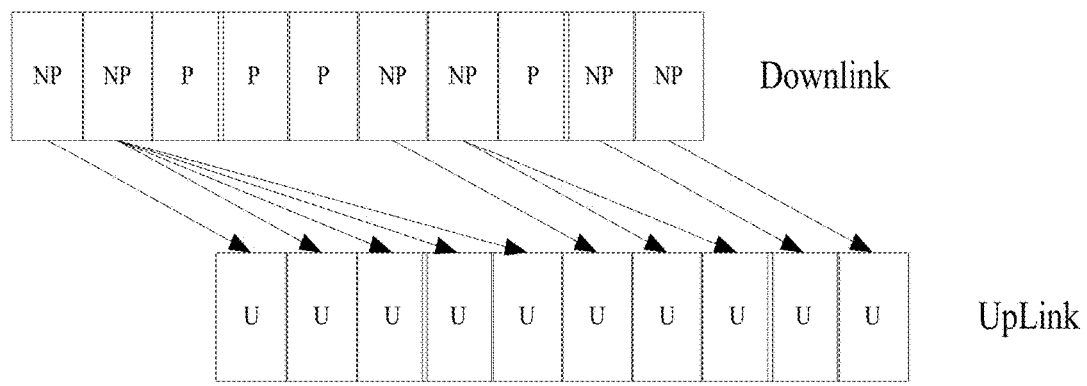
FIG. 7 is a diagram of cross-subframe scheduling in PMCH subframes in an NCT according to the disclosure.

As shown in FIG. 7, when a current DL subframe sent by the base station is a PMCH or MBMS subframe, the base station sends the DCI of the current subframe and/or the next X PMCH or MBMS subframes over a previous subframe, and indicates the subframe corresponding to the DCI via N bits in the DCI, wherein 0<X<5, and 0<N<4.

When a current DL subframe received by a terminal is a PMCH or MBMS subframe, the terminal receives scheduling information of the current subframe and/or the next X PMCH subframes over the previous subframe, and acquires the subframe corresponding to the DCI by receiving N bits in the DCI, wherein 0<X<5, and 0<N<4.

In FIG. 7, Downlink represents a downlink abbreviated as DL, Uplink represents an uplink abbreviated as UL, NP represents a non-PMCH subframe, P represents a PMCH subframe and U represents a UL subframe.

Embodiment 8

Figure 8:
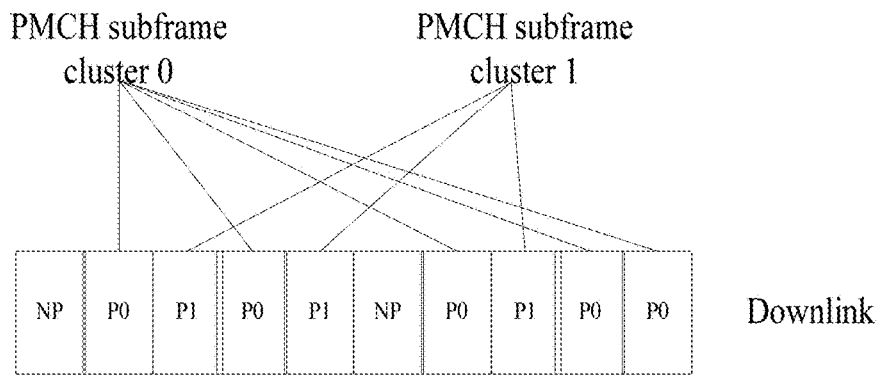
FIG. 8 is a diagram of configuration of a limiting layer in PMCH subframe clusters in an NCT according to the disclosure.

As shown in FIG. 8, a base station configures two PMCH subframe clusters for a terminal through a high-layer signalling, and configures to send PMCH subframe cluster 0 via one layer and to send PMCH subframe cluster 1 via two layers through the high-layer signalling.

The terminal acquires the two configured PMCH subframe clusters by receiving the high-layer signalling, and receives PMCH subframe cluster 0 via one layer and PMCH subframe cluster 1 via two layers through the high-layer signalling.

In FIG. 8, NP represents a non-PMCH subframe, P0 represents a limitation to the sending and receiving of PMCH subframes of PMCH subframe cluster 0 with one layer, and P1 represents a limitation to the sending and receiving of PMCH subframes of PMCH subframe cluster 1 with two layers.

Embodiment 9

Figure 9:
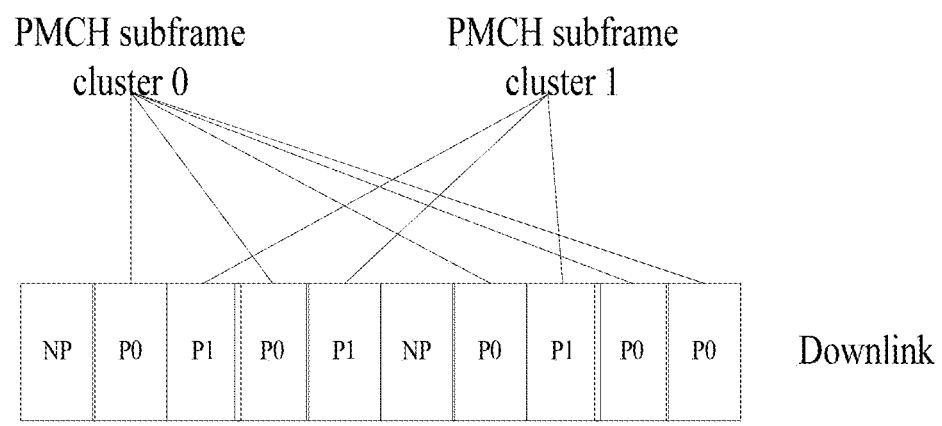
FIG. 9 is a diagram of configuration of a limiting port in PMCH subframe clusters in an NCT according to the disclosure.

As shown in FIG. 9, a base station configures two PMCH subframe clusters for a terminal through a high-layer signalling, and configures to send PMCH subframe cluster 0 via a port corresponding to a first layer and to send PMCH subframe cluster 1 via a port corresponding to a second layer through the high-layer signalling.

The terminal acquires the two configured PMCH subframe clusters by receiving the high-layer signalling, and receives PMCH subframe cluster 0 through the port corresponding to the first layer and receives PMCH subframe cluster 1 through the port corresponding to the second layer through the high-layer signalling.

In FIG. 9, NP represents a non-PMCH subframe, P0 represents the sending and receiving of PMCH subframes of PMCH subframe cluster 0 with the port corresponding to the first layer of an MBMS, and P1 represents the sending and receiving of PMCH subframes of PMCH subframe cluster 1 with the port corresponding to the second layer of the MBMS.

Embodiment 10

Figure 10:
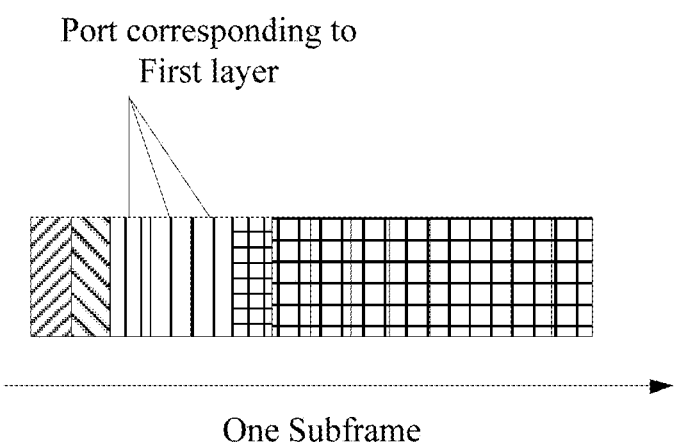
FIG. 10 is a diagram of limiting use of port for an MCCH in a PMCH subframe in an NCT according to the disclosure.

As shown in FIG. 10, when a current DL subframe sent by a base station is a PMCH or MBMS subframe, the base station always sends an MCCH at a port corresponding to a first layer in the PMCH subframe.

When a current DL subframe received by a terminal is a PMCH or MBMS subframe, the terminal always receives the MCCH at the port corresponding to the first layer in the PMCH subframe.

In FIG. 10, the locations padded with ▨ are Non PMCH OFDM symbols, the locations padded with ▦ are PMCH Data OFDM symbols, and the locations padded with ▥ are PMCH MCCH OFDM symbols.

Embodiment 11

When a current DL subframe sent by a base station is a PMCH or MBMS subframe, the base station always sends an MCCH at a port corresponding to a first layer in the PMCH subframe. When a port corresponding to an MBMS data layer is the same as the port adopted for the MCCH, the base station does not map MBMS data on a resource element of the MCCH, and when the port corresponding to the MBMS data layer is different from the port adopted for the MCCH, the base station may map the MBMS data on the resource element of the MCCH.

When a current DL subframe received by a terminal is a PMCH or MBMS subframe, the terminal always receives the MCCH at the port corresponding to the first layer in the PMCH subframe. When the port corresponding to the MBMS data layer is the same as the port adopted for the MCCH, the terminal does not receive the MBMS data on the resource element of the MCCH, and when the port corresponding to the MBMS data layer is different from the port adopted for the MCCH, the terminal receives the MBMS data on the resource element of the MCCH.

Embodiment 12

When a current DL subframe sent by a base station is a PMCH or MBMS subframe, the base station always sends an MCCH at a port corresponding to a first layer in the PMCH subframe.

The base station always does not map MBMS data on a resource element of the MCCH.

When a current DL subframe received by a terminal is a PMCH or MBMS subframe, the terminal always receives the MCCH at the port corresponding to the first layer in the PMCH subframe.

The terminal always does not receive the MBMS data on the resource element of the MCCH.

Annotations in both Chinese and English about English involved in the drawings are as follows:
EPDCCH: Enhanced Physical Downlink Control Channel;
PMCH: Physical Multicast Channel;
NCT: New Carrier Type;
BCT: Compatible Carrier Type;
NP: non-PMCH subframe;
U: UL subframe;
P: PMCH subframe;
D: DL subframe.

The above is only the preferred embodiments of the disclosure and not intended to limit the scope of protection of the disclosure.

INDUSTRIAL PRACTICABILITY

According to the solution for configuring the PMCH in the embodiments of the disclosure, the base station configures at least one of the transmission band, the frequency-domain location, the initial location of the OFDM symbol of the PMCH, the transmission subframe cluster of the PMCH, the number of transmission layers or the used port indexes and the number of ports of the PMCH and the MBMS reference signal pattern information for the PMCH or the MBMS through the high-layer signalling and/or the predefinition and/or the Multicast Control Channel (MCCH). By the embodiments of the disclosure, a problem about sending the MBMS during NCT enhancement may be solved.

What is claimed is:

1. A method for sending a channel based on a Physical Multicast Channel (PMCH) configuration, comprising:
    sending, by a base station, a PMCH and/or an Enhanced Physical Downlink Control Channel (EPDCCH) and/or a Multicast Control Channel (MCCH) according to Downlink Control Information (DCI) or predefinition indication;
    wherein when a current subframe sent by the base station is a PMCH or MBMS subframe, always sending, by the base station, the MCCH at a port corresponding to a first layer in the PMCH subframe; or
    when a port corresponding to an MBMS data layer is the same as a port adopted for the MCCH, not mapping, by the base station, MBMS data on a resource element of the MCCH; or
    when the port corresponding to the MBMS data layer is different from the port adopted for the MCCH, mapping, by the base station, the MBMS data on the resource element of the MCCH.

2. The method according to claim 1, wherein when a current subframe sent by the base station is a PMCH or MBMS subframe, the base station does not send the DCI over the current subframe, and the base station sends the DCI in the current subframe and/or the next X PMCH or MBMS subframes over a previous subframe, and indicates the subframe corresponding to the DCI to a terminal via N bits in the DCI, wherein 0<X<5, and 0<N<4.

3. The method according to claim 1, wherein when a current subframe sent by the base station is a PMCH or MBMS subframe, the base station determines the number of symbols for sending the EPDCCH according to a configured initial location of the PMCH or an MBMS, and
    when the first one or two Orthogonal Frequency Division Multiplexing (OFDM) symbols in a subframe are not configured to send the PMCH, the base station sends the EPDCCH via the first one or two OFDM symbols.

4. A system for sending a channel based on a Physical Multicast Channel (PMCH) configuration, comprising: a first channel sending unit, located on a base station side and configured to send a PMCH and/or an Enhanced Physical Downlink Control Channel (EPDCCH) and/or a Multicast Control Channel (MCCH) according to Downlink Control Information (DCI) or predefinition indication,
    the first channel sending unit is further configured to always send the MCCH at a port corresponding to a first layer in the PMCH subframe, when a current subframe sent by the base station is a PMCH or MBMS subframe, or
    the first channel sending unit is further configured to not map MBMS data on a resource element of the MCCH, when a port corresponding to an MBMS data layer is the same as a port adopted for the MCCH, or
    the first channel sending unit is further configured to map the MBMS data on the resource element of the MCCH, when the port corresponding to the MBMS data layer is different from the port adopted for the MCCH.

5. A method for receiving a channel based on a Physical Multicast Channel (PMCH) configuration, comprising:
    receiving, by a terminal, a PMCH and/or an Enhanced Physical Downlink Control Channel (EPDCCH) and/or a Multicast Control Channel (MCCH) according to Downlink Control Information (DCI) or predefinition indication configured by a base station,
    wherein when a current DownLink (DL) subframe received by the terminal is a PMCH or MBMS subframe, always receiving, by the terminal, the MCCH at a port corresponding to a first layer in the PMCH subframe or the MBMS subframe, or
    when a port corresponding to an MBMS data layer is the same as a port adopted for the MCCH, not receiving, by the terminal, MBMS data on a resource element of the MCCH, or
    when the port corresponding to the MBMS data layer is different from the port adopted for the MCCH, receiving, by the terminal, the MBMS data on the resource element of the MCCH.

6. The method according to claim 5, wherein when a current subframe received by the terminal is a PMCH or MBMS subframe, the terminal receives the DCI in the current subframe and/or the next X PMCH or MBMS subframes over a previous subframe, and acquires the subframe corresponding to the DCI by detecting N bits in the DCI, wherein 0<X<5, and 0<N<4.

7. The method according to claim 5, further comprising: always not receiving, by the terminal, MBMS data on a resource element of the MCCH.

8. A system for receiving a channel based on a Physical Multicast Channel (PMCH) configuration, comprising: a first channel receiving unit, located on a terminal side and configured to receive a PMCH and/or an Enhanced Physical Downlink Control Channel (EPDCCH) and/or a Multicast Control Channel (MCCH) according to Downlink Control Information (DCI) or predefinition indication configured by a base station,
    the first channel receiving unit is further configured to always receive the MCCH at a port corresponding to a first layer in the PMCH subframe or the MBMS subframe, when a current DownLink (DL) subframe received by the terminal is a PMCH or MBMS subframe, or
    the first channel receiving unit is further configured to not receive MBMS data on a resource element of the MCCH, when a port corresponding to an MBMS data layer is the same as a port adopted for the MCCH, or
    the first channel receiving unit is further configured to the MBMS data on the resource element of the MCCH, when the port corresponding to the MBMS data layer is different from the port adopted for the MCCH.

* * * * *